United States Patent
Martin et al.

(10) Patent No.: US 8,594,646 B2
(45) Date of Patent: Nov. 26, 2013

(54) WIRELESS DEVICE, PROCESSING SYSTEM AND METHOD OF OPERATING A WIRELESS DEVICE

(75) Inventors: Brian Martin, Farnham (GB); Keiichi Kubota, Weybridge (GB)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/190,794

(22) Filed: Jul. 26, 2011

(65) Prior Publication Data

US 2013/0029651 A1    Jan. 31, 2013

(51) Int. Cl.
H04M 3/00    (2006.01)

(52) U.S. Cl.
USPC ........ 455/418; 455/522; 455/574; 455/343.1; 455/343.2; 455/343.4

(58) Field of Classification Search
USPC ......... 455/418, 522, 574, 343.1, 343.2, 343.4
See application file for complete search history.

(56) References Cited

U.S. PATENT DOCUMENTS

2006/0126554 A1*  6/2006  Motegi et al. ................. 370/328
2008/0108346 A1*  5/2008  Umatt et al. ............... 455/432.1
2010/0195548 A1    8/2010  Navda et al. .................. 370/311
2010/0254290 A1   10/2010  Gong et al. .................... 370/311
2011/0319064 A1* 12/2011  Lenart et al. .................. 455/418

FOREIGN PATENT DOCUMENTS

| EP | 1 318 687 A2 | 6/2003 |
| EP | 2 046 000 A1 | 4/2009 |
| GB | 2 324 681 A | 10/1998 |
| WO | WO 2010/138587 A1 | 12/2010 |

* cited by examiner

Primary Examiner — Kwasi Karikari

(57) ABSTRACT

A wireless device is wirelessly connected to a wireless network which is controlled by network control apparatus. The wireless device operates in a first activity state in which data can be transmitted to and received from the wireless network over one or more dedicated logical channels. The wireless device transitions to operate in a second activity state having lower power consumption than the first activity state if it is determined by the wireless device that data has not been transmitted by and has not been received at the wireless device for a predetermined period of time. The predetermined period of time is known to both the wireless device and the network control apparatus. The transition takes place synchronously without requiring control signals to be passed between the wireless device and the network control apparatus.

26 Claims, 2 Drawing Sheets

WIRELESS DEVICE, PROCESSING SYSTEM AND METHOD OF OPERATING A WIRELESS DEVICE

TECHNICAL FIELD

The present invention relates to a wireless device, a processing system for a wireless device and a method of operating a wireless device.

BACKGROUND

Wireless networks have in recent years experienced a considerable increase in the amount of data being transmitted to and from wirelessly connected devices or user equipment, which includes mobile or cell phones (including so-called "smart phones"), personal digital assistants, pagers, tablet and laptop computers, content-consumption or generation devices (for music and/or video for example), data cards, or USB dongles, etc., as well as fixed or more static devices, such as personal computers, game consoles and other generally static entertainment devices, various other domestic and non-domestic machines and devices, etc. This increase in traffic has been mainly due to the rapid and widespread uptake of smart phones, the availability of mobile broadband dongles for computers and affordable rates for consumers.

The traffic characteristics of this data traffic are very different from that of traditional mobile phones, and can be characterized by its use of a lot of background signalling and bursty traffic consisting of relatively small data packets. The introduction of machine-type communications to the networks can also be expected to follow this trend. As a result, wireless networks need to implement new mechanisms to cope with this new traffic and make efficient use of the available resources while providing high capacity and throughputs and minimum delays. Of particular concern in improving the support of this low volume, bursty data is minimising the signalling load on the network and improving the power consumption of the user equipment.

The user equipment is typically in one of a number of predefined activity states. These may be for example an idle state, a paging state in which the user equipment checks the paging channel for incoming paging messages at predefined time intervals, and one or more data connection states in which the user equipment can actively transmit and receive data. In general, these states use increasingly more power at the user equipment and also more network signalling. One way to reduce power consumption and the amount of network signalling is to reduce the frequency with which the user equipment connects to the network, for example when looking for incoming control signals and/or data. However, this can limit how efficiently the user equipment can reselect other network cells and may even preclude some choices.

This can be exemplified by work currently being carried out on FE-FACH (Further Enhancement to CELL_FACH (Forward Access Channel)) for Release 11 of the 3rd Generation Partnership Project or 3GPP. The system currently in use provides for a number of defined activity states for the user equipment, including an Idle state, a CELL_PCH/URA_PCH (paging channel) state, a CELL_FACH (forward access channel) state, and a CELL_DCH (dedicated channel) state. In the Idle state, the user equipment does not have an RRC (Radio Resource Control) connection and is the state having the lowest power consumption. In the CELL_PCH/URAPCH state, the user equipment is again in a low power consumption state as it only intermittently looks for incoming paging messages, and in this state does have a RRC connection. However, the user equipment needs to be in the CELL_FACH or CELL_DCH state in order to be able to perform both transmission and reception of data (including in particular "user" data, as opposed to data relating to control or management of the device and its network connection, etc. for example). In the CELL_DCH state, a dedicated physical channel is allocated to the user equipment. In the CELL_FACH state, the user equipment shares the physical channel with other user equipment, though nevertheless may have a dedicated logical channel. As is well understood, a logical channel in this context is an information stream dedicated to the transfer of a specific type of information over the radio interface and corresponds to an individual signal which can be separated or isolated from an aggregate of signals which occupy the same physical bandwidth or channel CELL_FACH can be regarded as a transition state between the CELL_PCH/URA_PCH and CELL_DCH states. Keeping the user equipment in CELL_FACH state improves power consumption for the user equipment compared to the CELL_DCH state (because the transmitter and/or receiver may be switched off for longer periods of time while no uplink data is available and during discontinuous reception or "DRX") and also reduces the network signalling load (by avoiding radio resource control or "RRC" signalling to perform a state transition from the PCH or Idle states to the CELL_FACH state when both data transmission and reception are required). Nevertheless, the CELL_FACH state still has a higher power consumption for the user equipment than the PCH or Idle states.

To address this, it has been proposed to introduce a longer, secondary DRX cycle in the CELL_FACH state. In particular, in the CELL_FACH state at present, the user equipment is only periodically receptive to incoming control signals from the network, including in particular the HS-DSCH High Speed Downlink Shared Channel signal, using a relatively short cycle period. It is proposed to use a second, longer cycle period if there has been no data activity for a predetermined period of time, which would reduce the power consumed by the user equipment. However, the measurement performance requirements for the user equipment in the CELL_FACH state mean that the mobility of the user equipment is less efficient than when in the CELL_PCH/URA_PCH state, i.e. the user equipment is somewhat restricted when it attempts to reselect a different network cell, which possibly uses a different protocol. Particular examples are that currently reselection to a cell using LTE (the "Long Term Evolution" standard) is not supported at all, and longer times may be needed to reselect within a UTRAN ("universal mobile telecommunications terrestrial radio access network") system. This in turn means that a network operator typically would not want to keep user equipment in the CELL_FACH state for long periods of time, and therefore this proposal may have only a limited or minor benefit.

SUMMARY

In accordance with a first aspect the present invention, there is provided a method of operating a wireless device, the wireless device being wirelessly connected to a wireless network which is controlled by network control apparatus, the method comprising: operating the wireless device in a first activity state in which data can be transmitted to and received from a wireless network over one or more dedicated logical channels; the wireless device transitioning to operate in a second activity state having lower power consumption than the first activity state if it is determined by the wireless device that data has not been transmitted by the wireless device and data has not been received at the wireless device over the wireless network for a predetermined period of time, the predetermined period of time being known to both the wireless device and the network control apparatus, the transition taking place synchronously without requiring control signals to be passed between the wireless device and the network control apparatus.

The method allows power consumption by the wireless device to be reduced at times when there is no data activity, and allows this to be achieved in preferred embodiments without adding to the overhead associated with control signals being sent back and forth between the device and the network control apparatus, and yet in a way that the transition is known to the network control apparatus such that the transition is effectively synchronised. In a typical case, this helps improve battery life for the user without increasing the control signal traffic that passes across the wireless network. In particular embodiments, in the first activity state, the wireless device may be provided with one or more dedicated physical channels, i.e. be able to transmit and receive data over one or more dedicated physical channels.

The predetermined period of time may be a fixed time period stored by the wireless device. Alternatively, the predetermined period of time may be an adjustable time period stored by the wireless device. In an embodiment, the time period can be adjusted by control signals received from the network control apparatus. This option provides the most flexibility and also control for the network operator.

In an embodiment, the second activity state is one in which the wireless device is incapable of transmitting data to the wireless network over a dedicated logical channel. Various telecommunications standards and protocols typically define a number of states in which the wireless devices can operate. One or more of those states may be one that uses relatively low power by restricting the ability of the device to send data and may be used as the second activity state.

In an embodiment, when the wireless device is operating in the second activity state and needs to transmit data across the wireless network, the wireless device transitions to the first activity state. This can be achieved without any exchange of control signals with the network control apparatus, or at least with a reduced exchange of control signals compared to the prior art, again helping to keep down the control signal traffic on the network. Certain specific times may be used for this transition in certain embodiments.

In an embodiment, when the wireless device is operating in the second activity state, the wireless device periodically checks for data transmission incoming from the wireless network and transitions to the first activity state to receive data when an incoming data transmission is detected. Again, this can be achieved without any exchange of control signals with the network control apparatus, or at least with a reduced exchange of control signals compared to the prior art, further helping to keep down the control signal traffic on the network.

In an embodiment, the network control apparatus comprises a Radio Network Controller (RNC) and said control signals are Radio Resource Control (RRC) signals.

In an embodiment, the first activity state is a CELL_FACH state and the second activity state is one of a CELL_PCH state, URA_PCH state and an Idle state. Preferably, the second activity state is a CELL_PCH state. Such states are defined in 3GPP, as discussed above and further below. The use of the CELL_PCH state as the second activity state is preferred over the Idle state or URA_PCH state as it minimises the amount of control signals that need to be passed back and forth between the network operator and the wireless device to restore the device to the CELL_FACH state whenever the device needs to both transmit and receive data. This is particularly the case as the wireless device location in CELL_PCH is known by the network at a per cell level, which means that any mobility performed by the wireless device (i.e. reselection between cells) is known by the network at a cell level (as is also the case in CELL_FACH state).

In accordance with a second aspect the present invention, there is provided a processing system for a wireless device which is wirelessly connectable to a wireless network which is controlled by network control apparatus, the processing system being constructed and arranged to cause a said wireless device to operate in a first activity state in which data can be transmitted to and received from a wireless network over one or more dedicated logical channels, and to transition to operate in a second activity state having lower power consumption than the first activity state if it is determined by the processing system that data has not been transmitted by the wireless device and data has not been received at the wireless device over the wireless network for a predetermined period of time, the predetermined period of time being known to both the processing system and the network control apparatus, the transition taking place synchronously without requiring control signals to be passed between the wireless device and the network control apparatus.

The processing system may comprise at least one processor and at least one memory including computer program code, the at least one memory and the computer program code being configured, with the at least one processor, to cause the wireless device at least to perform a method as described above.

In accordance with a third aspect the present invention, there is provided a wireless device which is wirelessly connectable to a wireless network which is controlled by network control apparatus, the wireless device being constructed and arranged to operate in a first activity state in which data can be transmitted to and received from a wireless network over one or more dedicated logical channels, and to transition to operate in a second activity state having lower power consumption than the first activity state if it is determined by the wireless device that data has not been transmitted by the wireless device and data has not been received at the wireless device over the wireless network for a predetermined period of time, the predetermined period of time being known to both the wireless device and the network control apparatus, the transition taking place synchronously without requiring control signals to be passed between the wireless device and the network control apparatus.

Further features and advantages of the invention will become apparent from the following description of preferred embodiments of the invention, given by way of example only, which is made with reference to the accompanying drawings.

DETAILED DESCRIPTION

Figure 1:
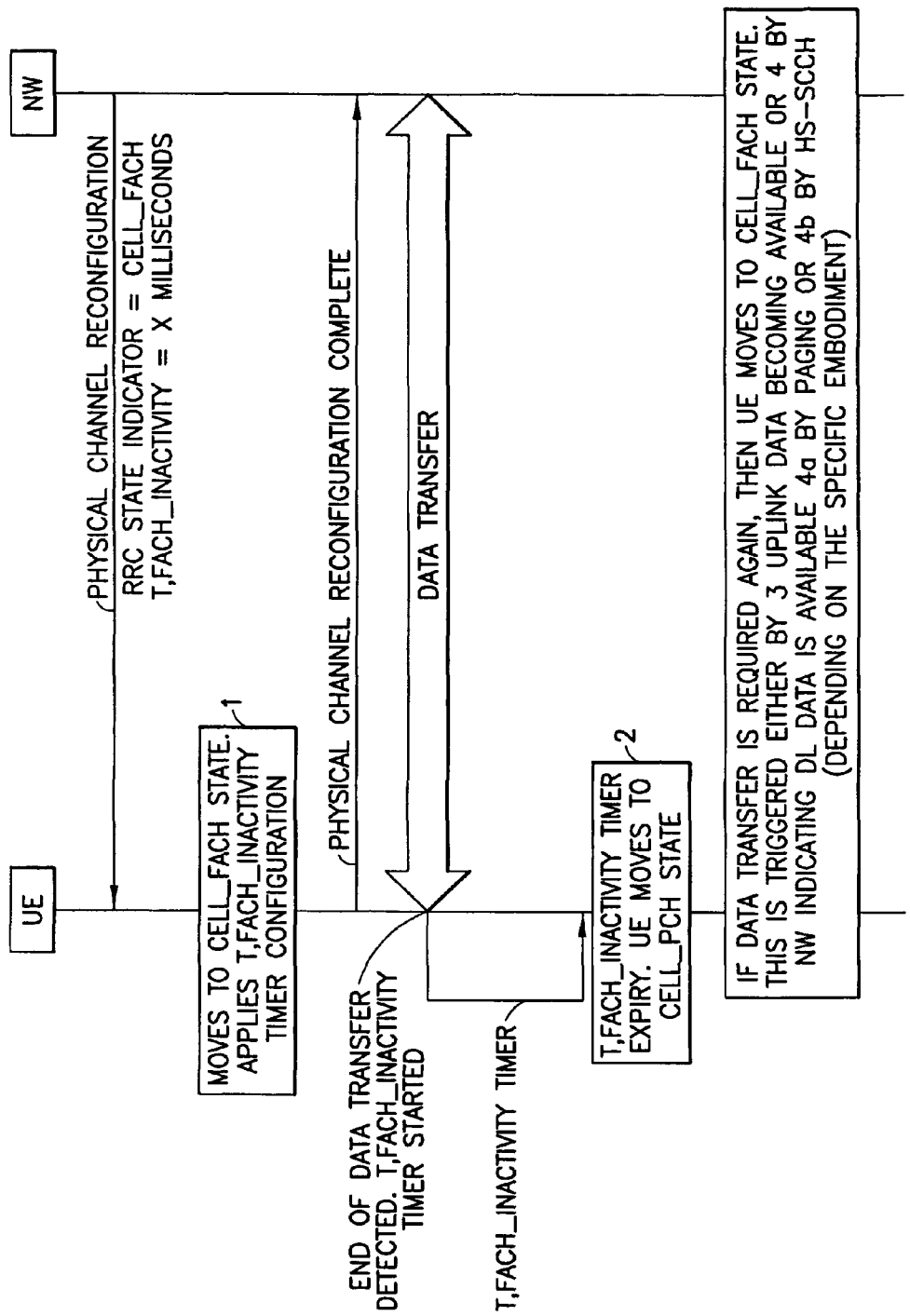
FIG. 1 shows schematically examples of state transitions in accordance with embodiments of the present invention.

The following description is given principally in connection with wireless devices or "user equipment" that operates in accordance with the 3rd Generation Partnership Project or 3GPP protocols and standards, and more specifically WCDMA (Wideband Code Division Multiple Access)/UMTS (Universal Mobile Telecommunications System). Nevertheless, the principles described may have application to other similar wireless standards and protocols, particularly where it is desired to reduce power consumption by a wireless device when possible but without increasing the control signal traffic required to do so or to bring the device back to a previous operating state. Wireless or mobile devices include mobile or cell phones (including so-called "smart phones"), personal digital assistants, pagers, tablet and laptop computers, content-consumption or generation devices (for music and/or video for example), data cards, or USB dongles, etc.

In general, in many types of wireless systems, the user equipment is typically in one of a number of predefined activity states. These may be for example an idle state, a paging state in which the user equipment checks the paging channel for incoming paging messages at predefined time intervals, and one or more data connection states in which the user equipment can actively transmit and receive data. In general, these states use increasingly more power at the user equipment and also more network signalling. In order to minimise power consumption, particularly to maximise battery life before recharging is required, the user equipment is often caused to operate in a state having a low or the lowest power consumption possible, depending on for example the operational demands of the user equipment and/or network requirements. A particular concern from the perspective of the wireless network operator is to keep down the amount of control signals that have to be passed to and from the user equipment in order to cause the user equipment to transition between states, and/or to allow the user equipment to send or receive data, and/or to locate the user equipment.

As mentioned above, 3GPP currently provides for a number of defined activity states for the user equipment, including an Idle state, a CELL_PCH/URA_PCH (paging channel) state, a CELL_FACH (forward access channel) state, and a CELL_DCH (dedicated channel) state. In the Idle state, the user equipment does not have an RRC (Radio Resource Control) connection and is the state having the lowest power consumption. In the CELL_PCH/URA_PCH state, the user equipment is again in a low power consumption state as it only intermittently looks for paging messages, and in this state does have a RRC connection. However, the user equipment needs to be in the CELL_FACH or CELL_DCH state in order to be able to perform both transmission and reception of data. Such data includes in particular "user" data, as opposed to data relating to control or management of the device and its network connection, etc. for example. In the CELL_DCH state, a dedicated physical channel is allocated to the user equipment. In the CELL_FACH state, the user equipment shares the physical channel with other user equipment, though nevertheless may have a dedicated logical channel. As is well understood, a logical channel in this context is an information stream dedicated to the transfer of a specific type of information over the radio interface and corresponds to an individual signal which can be separated or isolated from an aggregate of signals which occupy the same physical bandwidth or channel. The CELL_FACH state improves power consumption for the user equipment compared to the CELL_DCH state (because the transmitter and/or receiver may be switched off for longer periods of time while no uplink data is available and during discontinuous reception or "DRX") and also reduces the network signalling load (by avoiding radio resource control or "RRC" signalling to perform a state transition from the PCH or Idle states to the CELL_FACH state when both data transmission and reception are required). Nevertheless, the CELL_FACH state still has a higher power consumption for the user equipment and uses more network signalling traffic than the PCH or Idle states.

Currently, when wanting to be able to both send and receive data, the user equipment is in either the CELL_DCH or the CELL_FACH state. If the user equipment is in the CELL_DCH state but data traffic volumes to and from the user equipment are low enough for a predetermined period of time (such as a few seconds, such as 3 to 5 seconds say), then the user equipment is caused to transition to operate in the CELL_FACH state. Then, if there is no data traffic to and from the user equipment for a predetermined period of time (such as a few tens of seconds, such as 30 to 100 seconds say, or even perhaps a few hundreds of seconds), then the user equipment is caused to transition to operate in the CELL_PCH or the URA_PCH state (if used) or the Idle state. If operating in the CELL_PCH or the URA_PCH state and there is no activity for an hour say, the user equipment is caused to transition to operate in the Idle state. It will be understood that the times given here are examples only, given for illustrative purposes.

It is important that the network operator (or more specifically the network control apparatus equipment, such as a Radio Resource Controller) knows when the user equipment is transitioning between states. Currently, the transition process is typically achieved in one of two ways.

The first option is that the network control apparatus uses some method to decide when to command the user equipment to move between states, for example to move to the CELL_PCH (or Idle) state from the CELL_DCH state or more usually from the CELL_FACH state. This can be by using a time out value relating to when data was last sent to or received from the user equipment. As a result, the network control apparatus sends a reconfiguration message (using RRC signalling) to the user equipment, and then receives a confirmation signal back once the transition has been made. For example, as just one example of the possible RRC message combinations that are used), the following exchange of control signals takes place:

NW->UE: Physical Channel Reconfiguration
UE->NW: Physical Channel Reconfiguration Complete where UE is the user equipment and NW is the network control apparatus. In this respect, it will be understood that the "network control apparatus" is the overall apparatus that provides for general management and control of the network and connected devices. Such apparatus may in practice be constituted by several discrete pieces of equipment. As a particular example in the context of UMTS, the network control apparatus may be constituted by for example a so-called Radio Network Controller operating in conjunction with one or more Node Bs (which, in many respects, can be regarded as "base stations"). As another example, UMTS LTE makes use of a so-called Evolved Node B (eNB) where the RF transceiver and resource management/control functions are combined into a single entity.

The second option is that the user equipment and the network control apparatus use a feature known as "fast dormancy". In this case, the user equipment itself detects that there is no data activity. This may use a time out value measured by an internal timer of the user equipment. Another example is to have an internal interface that detects when the application layer in the user equipment has completed any data activity. In any event, a certain time after data was last transmitted and received, the user equipment indicates to the network control apparatus that it wants to move to another state. An example of the exchange of control signals which takes place is:

UE->NW: Signalling Connection Release Indication
NW->UE: Physical Channel Reconfiguration
UE->NW: Physical Channel Reconfiguration Complete As can be seen, both of these methods require control signals to be sent back and forth between the user equipment and the network control apparatus over the wireless network, which adds significantly to the network signalling traffic. This has a serious impact on the ability of the network control apparatus to handle a large number of user equipment simultaneously.

To avoid this, in broad terms, an example of a wireless device or "user equipment" is constructed and arranged such that when the wireless device is in operating in a first activity state in which data can be transmitted to and received from a wireless network (in particular over one or more dedicated logical channels at least), a timer in the wireless device is operated so that it can be determined if data has not been transmitted by the wireless device and data has not been received at the wireless device over the wireless network for a predetermined period of time. In that case, the wireless device transitions to operate in a second activity state having lower power consumption than the first activity state. The wireless device makes this transition "automatically", without requiring control signals to be passed between the wireless device and the network control apparatus, and thus this does not add to the control signal traffic passing across the network. Moreover, the predetermined period of time is known to both the wireless device and the network control apparatus, and thus the transition is effectively synchronised between the wireless device and the network control apparatus. The predetermined time period may be a fixed time period stored in the wireless device, the fixed time being be agreed with network operators and/or set in an appropriate standard. The predetermined time period may alternatively be an adjustable time period stored in the wireless device, in which case the user may be given an option to reconfigure the time period or, more conveniently for the network operator, the time period may be adjusted by the network control apparatus sending appropriate control signals to set the time period. This latter option provides the network operator with more control over the operation of the wireless devices by providing the network operator with the ability to tailor the time periods before transitions take place between the relevant activity states in the wireless devices depending on relevant current conditions of the network, such as current data and/or signalling traffic levels, the number of wireless devices connected, signal strength, etc. The control signals for adjusting the time period may be sent by the network control apparatus at any suitable time, but a particularly convenient time is when the wireless device transitions to the first activity state (in which it is capable of sending and receiving data).

Referring to FIG. 1, a specific example relevant to 3GPP may operate as follows. UE is again the user equipment and NW is the network control apparatus. In this case, the device transitions from the CELL_FACH state to the CELL_PCH state after a certain time period having no data activity. The time period is set by the network control apparatus (the RNC in this case).

1. On transition of the UE to the CELL_FACH state, the NW signals to the UE in a reconfiguration message or CELL UPDATE CONFIRM/URA UPDATE CONFIRM message the FACH->PCH fallback inactivity time period T,fach_inactivity.
2. After a time period T,fach_inactivity without any data activity, the UE enters the CELL_PCH state (without waiting for an explicit NW order). This may conveniently take place at a TTI (Transmission Timing Interval) boundary. The UE applies CELL_PCH parameters and timers, e.g. paging cycle periods, etc.

At some point, the user equipment will in general need to return to a state in which it can again send and/or receive data. This can be achieved by using existing techniques. However, alternative techniques not currently used have advantages in certain situations. Thus:

3. If the UE has uplink data to send, then either:
3a. the UE sends a Measurement Report message and then performs a transition to the CELL_FACH state to transmit the data (as happens currently); or:
3b. the UE waits until a specific time (e.g. the next paging occasion or DRX cycle period boundary), and then performs a transition to the CELL_FACH state to transmit the data. The UE maintains the CELL_FACH configuration that was previously used in order to achieve a seamless transition from the PCH state to the FACH state.
4. If the NW has downlink data to send while the UE is in the CELL_PCH state, then either:
4a. the NW provides a paging signal on PICH (the page indication channel), which the UE receives. The UE then monitors a paging channel (PCCH) and, if the UE receives a paging message designated for the UE, then the UE transitions to the CELL_FACH state (as happens currently); or:
4b. the UE checks HS-SCCH (the High Speed Shared Control Channel) at the paging cycle or a DRX (discontinuous reception) cycle boundary for a downlink data transmission, and then transitions to the CELL_FACH state if a downlink data transmission is detected.

The main advantage of each of options 3a and 4a is that the user equipment can completely re-use the CELL_PCH state as well as the processes for transitioning between the CELL_PCH and CELL_FACH states that are currently in use. These options therefore have the minimum impact on and therefore require the minimum changes to the specification and configuration of the user equipment. The user equipment can apply all of the existing CELL_FACH and CELL_PCH functionality, timers, etc. The only new functionality required overall is the use of the timer (T,fach_inactivity sent by the network control apparatus in the specific example described above) and the automatic transition from FACH to PCH on timer expiry.

The main advantage of each of options 3b and 4b is that each typically uses less network signalling than the methods currently used as outlined in options 3a and 4a respectively (because no measurement report has to be sent by the user equipment and no paging signal has to be sent by the network control apparatus respectively), and thus each reduces the signalling load on the network even further. These options may also simplify some network implementations. On the other hand, for option 4b, it is necessary to specify that the user equipment monitors HS_SCCH periodically (for example at the paging cycle or a DRX cycle boundary) for downlink data transmission.

Thus, the preferred embodiments address the issue of control signalling load on the network, by avoiding increased RRC signalling, which can be a particular problem when state transition of the user equipment is frequent. The preferred embodiments achieve lower power consumption by the user equipment, which is mainly achieved in the specific examples above by allowing the user equipment to apply a longer DRX period typical of the CELL_PCH state during periods of data inactivity. Certain embodiments re-use the existing RRC states and state transitions, avoiding the need to introduce additional activity states (particularly a second CELL_FACH state which has been proposed by some as noted above), which simplifies manufacture and set up of the user equipment.

Figure 2:
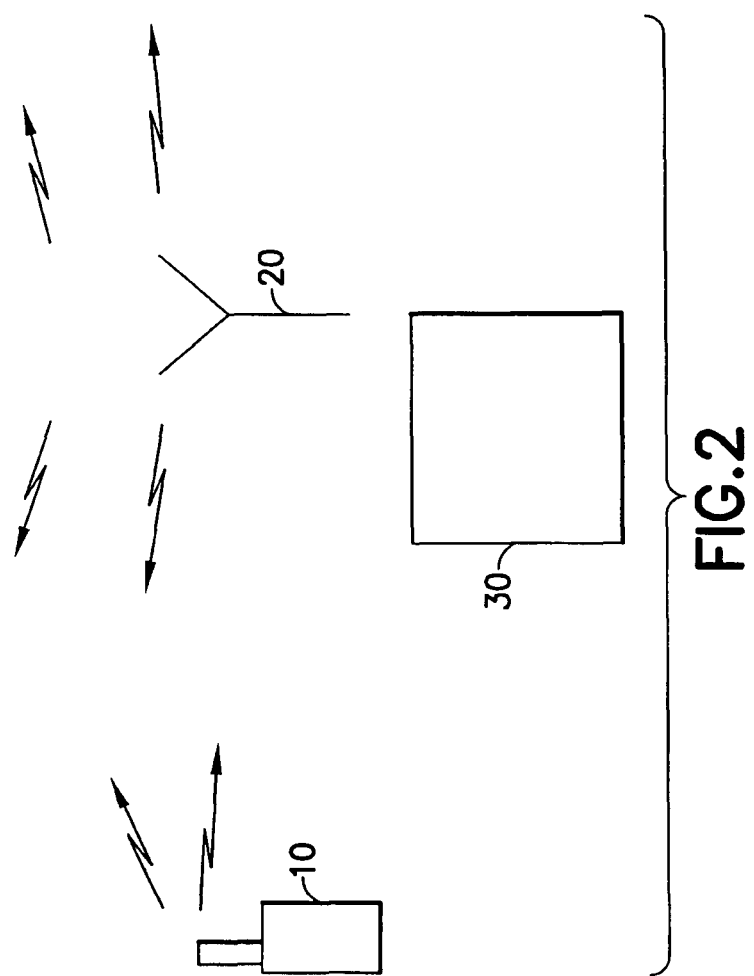
FIG. 2 shows schematically a wireless device and a radio mast/network control apparatus.

FIG. 2 shows schematically a user equipment, in this case in the form of a mobile phone/smartphone 10, in communication with a radio mast 20. The radio mast 20 in this case is in the form of a Node B which is in communication with a Radio Network Controller 30. The user equipment contains the necessary processor(s), radio module, antenna, etc. to enable wireless communication with the network.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above embodiments are to be understood as illustrative examples of the invention. Further embodiments of the invention are envisaged. For example, whilst described principally in the context of devices operating according to 3GPP, and specifically WCDMA, the principles of the invention can be applied to other wireless standards and protocols, including for example LTE (Long Term Evolution), CDMA, WiMAX (Worldwide Interoperability for Microwave Access), and others that have power-savings states for the devices. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of operating a wireless device, the method comprising:
   operating the wireless device in a first activity state in which data can be transmitted to and received from a wireless network over one or more dedicated logical channels;
   the wireless device transitioning to operate in a second activity state having lower power consumption than the first activity state if it is determined by the wireless device that data has not been transmitted by the wireless device and data has not been received at the wireless device over the wireless network for a predetermined period of time, the predetermined period of time being known to both the wireless device and to a network control apparatus, the transition taking place synchronously between the wireless device and the network control apparatus and without requiring control signals to be passed between the wireless device and the network control apparatus, wherein the transitioning to operate in the second activity state takes place at a next Transmission Timing Interval (TTI) boundary following the predetermined period of time.

2. The method according to claim 1, wherein the predetermined period of time is a fixed time period stored by the wireless device.

3. The method according to claim 1, wherein the predetermined period of time is an adjustable time period stored by the wireless device.

4. The method according to claim 3, wherein the time period can be adjusted by control signals received from the network control apparatus.

5. The method according to-claim 1, wherein the second activity state is one in which the wireless device is incapable of transmitting data to the wireless network over a dedicated logical channel.

6. The method according to-claim 1, wherein the network control apparatus comprises a Radio Network Controller (RNC) and said control signals are Radio Resource Control (RRC) signals.

7. The method according to claim 1, wherein the first activity state is a cell-forward access channel CELL_FACH state and the second activity state is one of a cell-paging channel CELL_PCH state, a UTRAN registration area-paging channel URA_PCH state and an Idle state.

8. An apparatus comprising:
   a processing system comprising at least one processor and a memory storing a set of computer instructions, in which the processing system is arranged to:
   cause a wireless device to operate in a first activity state in which data can be transmitted to and received from a wireless network over one or more dedicated logical channels, and
   transition to operate the wireless device in a second activity state having lower power consumption than the first activity state if it is determined by the processing system that data has not been transmitted by the wireless device and data has not been received at the wireless device over the wireless network for a predetermined period of time, the predetermined period of time being known to both the processing system and a network control apparatus, the transition taking place synchronously between the wireless device and the network control apparatus and without requiring control signals to be passed between the wireless device and the network control apparatus, wherein the transition to operate in the second activity state takes place at a next Transmission Timing Interval (TTI) boundary following the predetermined period of time.

9. The apparatus according to claim 8, wherein the predetermined period of time is a fixed time period stored by the processing system.

10. The apparatus according to claim 8, wherein the predetermined period of time is an adjustable time period stored by the processing system.

11. The apparatus according to claim 10, wherein the processing system is arranged to adjust the time period on receipt of control signals therefor sent by the network control apparatus.

12. The apparatus according to claim 8, wherein the second activity state is one in which a said wireless device is incapable of transmitting data to a said wireless network over a dedicated logical channel.

13. The apparatus according to claim 8, wherein the processing system is arranged to receive control signals in the form of Radio Resource Control (RRC) signals transmitted by a Radio Network Controller (RNC).

14. The apparatus according to claim 8, wherein the first activity state is a cell-forward access channel CELL_FACH state and the second activity state is one of a cell-paging channel CELL_PCH state, a UTRAN registration area-paging channel URA_PCH state and an Idle state.

15. A computer readable memory tangibly embodying a computer program executable by a computing device, the computer program comprising:
 code for operating a wireless device in a first activity state in which data can be transmitted to and received from a wireless network over one or more dedicated logical channels; and
 code for transitioning the wireless device to operate in a second activity state having lower power consumption than the first activity state if it is determined that data has not been transmitted by the wireless device and data has not been received at the wireless device over the wireless network for a predetermined period of time, the predetermined period of time being known to both the wireless device and to a network control apparatus, the transition taking place synchronously between the wireless device and the network control apparatus and without requiring control signals to be passed between the wireless device and the network control apparatus, wherein the wireless device is transitioned to operate in the second activity state at a next Transmission Timing Interval (TTI) boundary following the predetermined period of time.

16. The computer readable memory according to claim 15, wherein the predetermined period of time is a fixed time period stored by the wireless device.

17. The computer readable memory according to claim 15, wherein the predetermined period of time is an adjustable time period stored by the wireless device.

18. The computer readable memory according to claim 17, wherein the time period can be adjusted by control signals received from the network control apparatus.

19. The computer readable memory according to claim 15, wherein the second activity state is one in which the wireless device is incapable of transmitting data to the wireless network over a dedicated logical channel.

20. The computer readable memory according to claim 15, wherein the network control apparatus comprises a Radio Network Controller (RNC) and said control signals are Radio Resource Control (RRC) signals.

21. The computer readable memory according to claim 15, wherein the first activity state is a cell-forward access channel CELL_FACH state and the second activity state is one of a cell-paging channel CELL_PCH state, a UTRAN registration area-paging channel URA_PCH state and an Idle state.

22. The apparatus according to claim 8, wherein the apparatus comprises the wireless device.

23. The apparatus according to claim 8, wherein the first activity state is a cell-forward access channel CELL_FACH state and the second activity state is one of a cell-paging channel CELL_PCH state and a UTRAN registration area-paging channel URA_PCH state.

24. The method according to claim 1, wherein the first activity state is a cell-forward access channel CELL_FACH state and the second activity state is one of a cell-paging channel CELL_PCH state and a UTRAN registration area-paging channel URA_PCH state.

25. The computer readable memory according to claim 15, wherein the first activity state is a cell-forward access channel CELL_FACH state and the second activity state is one of a cell-paging channel CELL_PCH state and a UTRAN registration area-paging channel URA_PCH state.

26. The method according to claim 1, wherein the wireless device is operating in a Long Term Evolution (LTE) system and the network control apparatus is an enhanced-Node-B.

* * * * *

UNITED STATES PATENT AND TRADEMARK OFFICE
CERTIFICATE OF CORRECTION

| | | |
|---|---|---|
| PATENT NO. | : 8,594,646 B2 | Page 1 of 1 |
| APPLICATION NO. | : 13/190794 | |
| DATED | : November 26, 2013 | |
| INVENTOR(S) | : Brian Martin et al. | |

It is certified that error appears in the above-identified patent and that said Letters Patent is hereby corrected as shown below:

In the Claims

Column 10, line 27 "to-claim 1" should be changed --to claim 1--.
Column 10, line 31 "to-claim 1" should be changed --to claim 1--.

Signed and Sealed this
Eighteenth Day of February, 2014

Michelle K. Lee
*Deputy Director of the United States Patent and Trademark Office*